Dec. 6, 1966 J. T. VITO 3,289,964

ENDLESS TAPE HOLDER ASSEMBLY

Filed May 27, 1965

INVENTOR
J. T. VITO
By John Maier, III
ATTORNEY

United States Patent Office 3,289,964

Patented Dec. 6, 1966

3,289,964

ENDLESS TAPE HOLDER ASSEMBLY

Joseph T. Vito, West Caldwell, N.J., assignor to Unireel, Inc., Montclair, N.J., a corporation of New Jersey Filed May 27, 1965, Ser. No. 459,180
10 Claims. (Cl. 242—55.19)

This invention relates to tape holder assemblies and more particularly to endless-tape holder assemblies for use in conjunction with a sound reproducing or recording device. However, the word "tape" when used in this specification and claims includes films and other strip-like material.

The use of endless-tape holding assemblies or cartridges is known and such cartridges have been produced on a large scale. A major application for endless tape cartridges has been with a coil of magnetic tape on which sound, such as music, is recorded. The cartridges are readily placed on a sound reproducing device with the tape in contact with a modulation-responsive head for reproducing sound from the magnetic tape as it passes in sliding contact with the modulation-responsive head. In this way, endless tape cartridges serve as a readily transportable type of sound storing device to be used, for example, for the reproducing of music in automobiles.

However, in the past, such endless tape cartridges have contained numerous separate parts at least most of which have been moving parts. In particular, it was essential that a rotating wheel on which the endless tape was wound be located within the cartridges. In order to feed the tape from the wheel, various separate parts which rotated independently of one another as well as a spring-loaded brake were required for proper operation of the cartridge. As is readily apparent, such parts had to be individually molded and assembled. This separate molding and the time for assembly resulted in a large portion of the cost of a cartridge. Therefore, it is apparent that a need has existed for a device of simplified construction which eliminates as many parts as possible and all moving parts and which can be made at a drastic cost reduction.

Therefore it is an object of this invention to produce an endless tape holder assembly of simplified construction and reduced cost.

Another object is to produce an endless tape holder assembly without moving parts.

In accordance with this invention, a hub is rigidly mounted in a position to be within the inner convolution of an endless coil of tape. Guide means are provided to guide the inner convolution which slides from around the hub and returns the tape to the outer convolution. Preferably, the cartridge is formed in two portions, with one section of the hub as part of one portion and the other section of the hub as part of the other portion.

A fuller understanding of this invention may be had by referring to the following description and claims taken in conjunction with the accompanying drawings in which:

Figures 1, 2, 3:
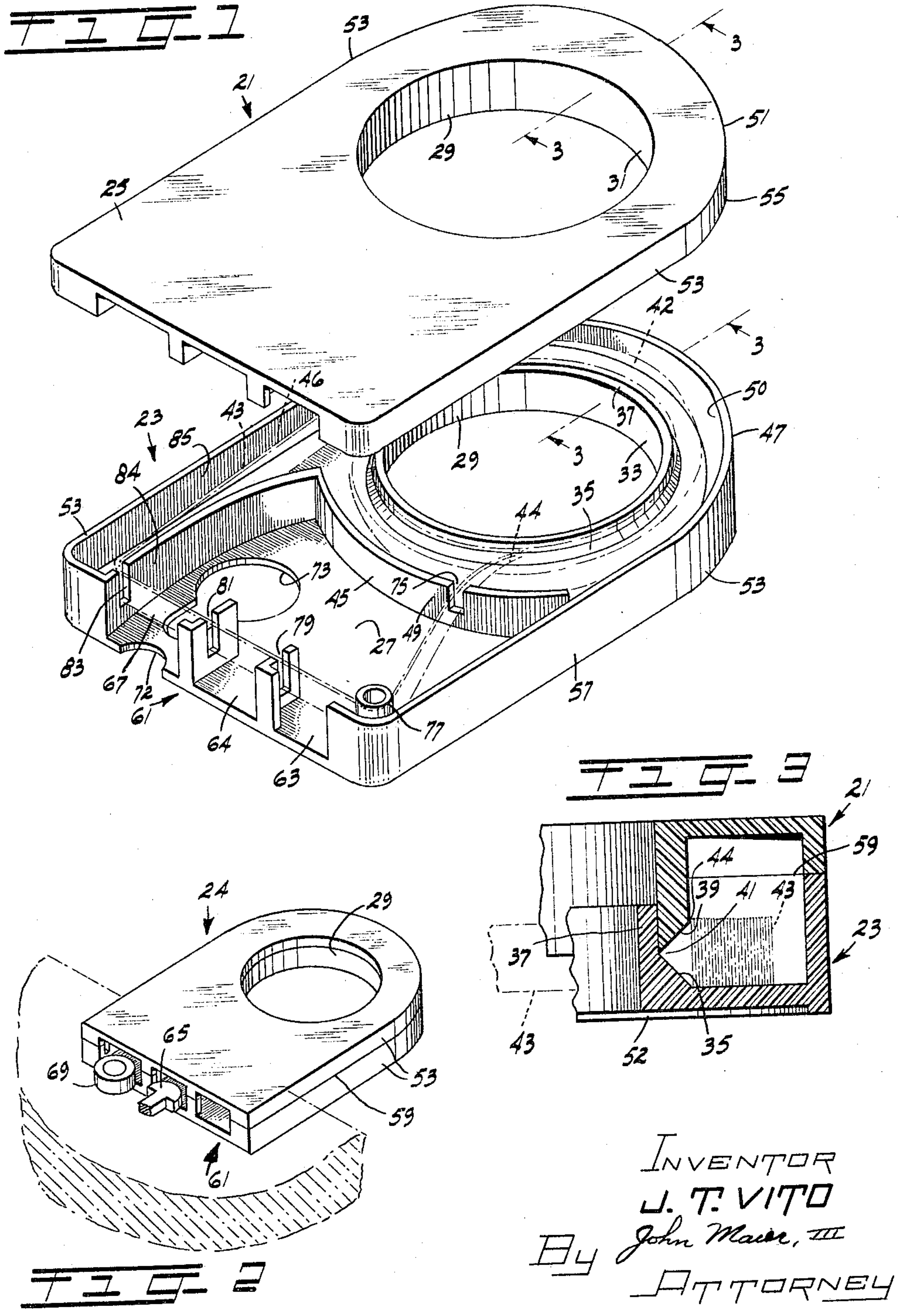
FIGURE 1 is an exploded pictorial representation of the invention.
FIGURE 2 is a pictorial representation of the invention in conjunction with a sound reproducing device.
FIGURE 3 is a cross-sectioned view taken along line 3—3 of FIGURE 1.

Referring now to the drawings and more particularly to FIGURE 1, the tape cartridge is formed from plastic-type material by molding, with a top portion 21 and a bottom portion 23. The outside of the top portion 21 and the bottom portion 23 forms a housing 24. The top portion 21 includes a top cover 25, and the bottom portion 23 includes a bottom cover 27. When assembled, the top cover 24 and the bottom cover 27 are substantially parallel. Extending between the top cover 25 and the bottom cover 27, is a hub 29. In molding, the hub 29 is formed from a top hub section 31 and a bottom hub section 33. The top hub section 33 slopes inwardly and upwardly from the bottom cover 27 to which it is joined to form a taper 35. Extending from the taper 35 is a cylindrical collar 37 which also is part of the bottom hub section 33. The outside diameter of the cylindrical collar 37 is just slightly less than the inside diameter of the upper hub section 31. The upper hub section 31, which is attached to the upper cover 25, also has a taper 39 at its end. By inserting the cylindrical collar 37 into the upper section 31, the taper 39 and the taper 33 form a V-type groove 41 in the assembled hub 29. It is thus readily seen that the hub 29 is in the form of a right cylinder with a V-type groove 41, adjacent the bottom cover 27 and lying in a plane substantially parallel to the covers 25, 27. The areas of the top cover 25 and the bottom cover which are within the hollow hub 29 are preferably left open in the molding operation. About the hub 31, a coil 42 of endless tape 43 is placed. As best seen in FIGURE 3, the inner convolution 44 of the endless coil 42 fits against the V-type groove 41. The width of the V-type groove 41 is approximately equal to the width of the tape 43.

An outer retainer 45 is located substantially concentrically about the hub 31, and a part of the outer retainer, which is in the form of a hollow cylinder, also forms a back end 47 to the housing 24. As with the hub 29, the outer retainer 45 is formed from a bottom or lower section 49 and a top or upper section 51. The outer retainer 45 is without the outer convolution 46 of the coil 42 of endless tape 43. In this way, the coil 42 is situated within an annular passageway 50 between the hub 29 and the outer retainer 45. The annular area 52 which is part of the bottom cover 23 which lies between the outer retainer 45 and the hub 29 is preferably slightly recessed inwardly to help to raise the coil just slightly above the plane of the bottom cover 23.

Two sides 53 are provided for the housing 24 and are located at approximately right angles to the top cover 25 and the bottom cover 27. The two side enclosures 53 are similarly formed for fabrication purposes with an upper side 55 as part of the top or upper portion 21 and a lower side 57 as part of the bottom or lower portion 23. It should be noted that the lower side and the lower section 49 of the back end 47, which is formed from a part of the outer retainer 45, are of approximately equal height from the bottom cover 27. Likewise, the upper section 55 of the sides 53 and the upper section 51 of the back end 47 are of approximately equal height so that the seam 59 (see FIGURE 2) in the housing 24, between the upper portion 21 and the lower portion 23, approximately lies in a plane parallel with the top cover 25 and the bottom cover 27. However, the distribution between the upper portion 21 and the lower portion 23 is controlled by the requirements of fabrication. The seam 59 is held closed by any suitable sealing technique.

A front end 61 is also located at right angles to the top cover 25 and the bottom cover 27 to form a square end to the housing 24. Use of a square end is preferred for inserting the cartridge into a sound reproducing or recording device, but changes in such devices could conceivably alter this requirement. Located in the front end 61 are two openings 63, 64, into which modulation-responsive heads 65 can be placed. Although only one such head 65 is shown in FIGURE 2, two may be utilized in certain applications, as for example, stereophonic sound. A third opening 67 is provided through the front end 61 to provide access for a drive assembly 69. The drive assembly 69 and the head or heads 65 are part of the sound reproducing equipment which utilizes the endless-tape cartridge. A notch in the edge of the bottom cover 27 adjacent the opening 67 as well as a key-shaped opening 73 in the bottom cover 27 also located in close proximity to the opening 69 permit use of opposing rollers in the drive assembly 69.

A slot opening 75 located in the outer retainer 45 may be provided as an exit opening for the tape 43. In place of the slot 75, the tape 43 may be pulled between the lower section 49 and the upper section 51 of the outer retainer 45 providing a sufficient gap exists. The tape is fed about a post 77 which is a cylindrical column and is located in the corner at the intersection of the front end 61 and the side 53 where the tape 43 leaves the hub 29. The post 77 is spaced close to the housing 24 and assists in holding the tape 43 taut, thereby eliminating the need for any backing assembly (not shown) to hold the tape 43 against the head or heads 65. Additional slot guides 79 and 81 are located on both sides of the opening 64 to guide the tape and hold it in contact with the head 65. Still another guide slot 83 is located on the side of the drive assembly 69 opposite from the guide 81, and a passageway 85 between the side 53 adjacent where the tape 43 returns and a rib member 84 provides for the tape 43 to return to the outer convolution 46 of the coil 43.

As is shown in FIGURE 1, the hub 29 is centered between the two sides 53 and located adjacent the back end 47. The hub 29 also has a diameter equal to a very major portion of the distance between the two sides 53. Use of a comparatively large diameter appears to be most favorable when a rigidly mounted hub is used in accordance with this invention in contrast to a rotatably mounted hub.

As can be readily seen, the endless tape 43 is pulled by the drive assembly 69 off the inner convolution 44 of the tape 43 through the opening 75 around the post 77 to the first modulation-responsive head opening 63 through a guide 79 to the second modulation-responsive head opening 64 to another guide 81 to the drive wheel assembly opening 69 through another guide 83 around which it is turned at approximately ninety degrees to the passageway 85 through the outer guide 45 and back to the outer convolution 46 of the tape 43. It can also be seen that only two parts in the form of the upper portion 21 and the lower portion 23 are required. These parts can be simply and inexpensively formed resulting in a drastic reduction of the cost since no additional parts or assembly time is required. This reduction is sufficient to lower the cost to the consumer by sixty percent while the resulting endless tape cartridge possesses excellent quality and durability.

It is understood that the above-described embodiment is simply illustrative of the application of the principles of the invention. Numerous other arrangements may readily be devised for those skilled in the art which will embody the principles of this invention and fall within the spirit and scope thereof.

What is claimed is:

1. An endless tape holder assembly comprising:
a housing means including a first cover means and a second cover means in spaced relationship therewith, said housing means further including side members between said first cover means and said second cover means;
a hub being rigidly mounted between said first cover means and said second cover means and in position to be within the inner convolution of an endless coil of tape, said hub being in the form of a cylinder with a groove extending about its periphery;
an outer retaining means having a cylindrical inner periphery and being rigidly mounted substantially concentrically with said hub and in position to be without the outer convolution of said endless coil of tape, said outer circular retaining means having an exit opening through which said endless tape moves out from the inner convolution and an entrance opening through which said tape moves in to the outer convolution; and guide means rigidly mounted within said housing means across which said tape is pulled from the inner convolution in sliding relationship with said outer convolution.

2. An endless tape holder assembly comprising:
a housing including a first cover means and a second cover means substantially parallel to the first cover means and in spaced relationship therewith, said housing further including two side members substantially parallel to one another and extending at approximately right angles to the edges of said first cover means and said second cover means;
a hub being rigidly mounted between said first cover means and said second cover means and in position to be within the inner convolution of an endless coil of tape, said hub being in the form of a cylinder with a groove extending about its periphery;
an outer circular retaining means being rigidly mounted substantially concentrically with said hub and in position to be without the outer convolution of said endless coil of tape, said outer circular retaining means having an exit opening through which said tape moves out from the inner convolution and an entrance opening through which said tape moves in to the outer convolution, said outer circular retaining means being partially co-extensive with said housing to form a back end for said housing, said housing further including a front end opposite said back end and substantially perpendicular to both said first and second cover means and to said two side members;
guide means rigidly mounted within said housing across which said tape is pulled from the inner convolution in sliding relationship with said hub and returned to said outer convolution, said guide means including a plurality of rigidly mounted members with slots therein located adjacent and across said front end, said front end being at least sufficiently open for access of a modulation-responsive head to the tape and for the access of drive means to the tape.

3. An endless tape holder assembly according to claim 2, wherein said groove is of a V-type shape and located nearer said first cover means than said second cover means in a plane substantially parallel to said first cover means and said second cover means.

4. An endless tape holder assembly comprising:
a housing including a top cover means and a bottom cover means substantially parallel to said top cover means and in spaced relationship therewith and further including two side members substantially parallel to one another and extending at approximately right angles from the edges of said top cover means and said bottom cover means;
a hub being rigidly mounted between said top cover means and being symmetrically located between said two side members and further being in position to be within the inner convolution of an endless coil of tape, said hub being in the form of a hollow right cylinder with a V-shaped groove having a width approximately equal to the width of said tape;
an outer circular retaining means substantially concentric with said hub and being rigidly mounted substantially concentric with said hub and in position to be without the outer convolution of said endless coil of tape, said outer circular retaining means having an exit opening through which said tape moves out from the inner convolution and an entrance opening through which said tape moves in to the outer convolution, the area of said bottom cover means between said circular guide means and said hub being slightly recessed toward said top cover means, said V-shaped groove lying in a plane substantially parallel to both said top cover means and said bottom cover means, and being closely adjacent said recessed area of said bottom cover means, a portion of said outer circular guide means forming a back end to said housing, said housing further including a front end opposite said back end substantially perpendicular to both said top and bottom cover means and said two side members; and guide means rigidly mounted within said housing across which said tape is pulled from the inner convolution in sliding relationship with said hub and is pulled to the outer convolution, said guide means including a plurality of rigidly mounted members having slots therein adjacent and across said front end, said front end being at least sufficiently open for access of a modulation-responsive head to the tape and for the access of a drive means to the tape.

5. An endless tape holder assembly comprising:

a housing formed from a first portion and a second portion, said first portion including a first cover and said second portion including a second cover, said first cover and said second cover being in spaced relationship;

a hub in the form of a cylinder rigidly mounted within said housing between said first cover and said second cover and in position to be within the inner convolution of an endless coil of tape, said hub being formed from a first section and a second section, said first section being integrally formed with said first cover and said second section being integrally formed with said second cover; and guide means rigidly mounted within said housing across which the tape is pulled from the inner convolution in sliding relationship with said hub and returned to the outer convolution.

6. An endless tape holder assembly comprising:

a housing formed from a first portion and a second portion, said first portion including a first cover and said second portion including a second cover, said first cover and said second cover being in spaced relationship and substantially parallel to one another;

a hub in the form of a cylinder rigidly mounted within said housing between said first cover and said second cover and in position to be within the inner convolution of an endless coil of tape, said hub being formed from a first section and a second section, said first section being integrally formed with said first cover and including a first hollow cylinder extending from said first cover with a first hollow frustrum of a cone extending from said first hollow cylinder, said second section including a second hollow frustrum of a cone extending from said second cover with a second hollow cylinder extending from said second hollow frustrum of a cone, said second hollow cylinder having an outside diameter substantially equal to the inside diameter of said first hollow frustrum of a cone and of said first hollow cylinder and being inserted therein for its entire length so that said first hollow frustrum of a cone and said second hollow frustrum of a cone are in contact at their smallest diameters thereby forming a V-groove in said hub; and guide means rigidly mounted within said housing across which the tape is pulled from the inner convolution in sliding relationship with said hub and returned to the outer convolution.

7. An endless tape holder assembly according to claim 6 wherein said first cover and said second cover are of substantially the same size and shape, each having two substantially parallel side edges and one square end and one rounded end.

8. An endless tape holder assembly comprising:

a housing formed from a top portion and a bottom portion, said top portion including a top cover with two substantially parallel side edges and one square end and one circular end, said top portion further including a top wall means extending an approximately equal distance from said side edges and said square end and said circular end, said bottom portion including a bottom cover of approximately the same size and configuration as said top cover with two parallel side edges and one square end and one circular end, said bottom portion further including a bottom wall means extending an approximately equal distance from said side edges and said square end and said circular end;

a hub in the form of a cylinder rigidly mounted within said housing between said first cover and said second cover and in position to be within the inner convolution of an endless coil of tape, said hub being formed from a first section and a second section, said first section being integrally formed with said first cover and said second section being integrally formed with said second cover; and guide means rigidly mounted within said bottom portion of said housing across which said tape is pulled from the inner convolution in sliding relationship with said hub and returned to said outer convolution, said guide means including a plurality of individual guide members located adjacent and across said square end of said bottom cover, said top wall means and said bottom wall means along said square end having openings therein.

9. An endless tape holder assembly comprising:

a housing formed from a top portion and a bottom portion, said top portion including a top cover with two parallel side edges and one square end and one circular end, said top portion further including a top wall means extending an approximately equal distance from said side edges and said square end and said circular end, said bottom portion including a bottom cover of approximately the same size and configuration as said top cover with two parallel side edges and one square end and one circular end, said bottom portion further including a bottom wall means extending an approximately equal distance from said side edges and said square end and said circular end, said top wall means along said square end of said top portion and said bottom wall means along said square end of said bottom portion forming a square end wall, a hub in the form of a cylinder rigidly mounted within said housing between said first cover and said second cover and in position to be within the inner convolution of an endless coil of tape, said hub being formed from a first section and a second section, said first section being integrally formed with said second cover, and guide means rigidly mounted along said square end wall within said bottom portion of said housing across which said tape is pulled from the inner convolution in sliding relationship with said hub and returned to said outer convolution, said square end wall having three rectangular openings therein, said three rectangular openings including a middle rectangular opening and a first side rectangular opening on one side of said middle rectangular opening and a second side rectangular opening on the other side of said middle rectangular opening, said guide means including a first slotted member between said first side rectangular opening and said middle rectangular opening and a second slotted member between said second side rectangular opening and said middle rectangular opening.

10. An endless tape holder assembly comprising:

a housing formed from a top portion and a bottom portion, said top portion including a top cover with two substantially parallel side edges and one square end and one circular end, said top portion further including a top wall means extending an approximately equal distance from said side edges and said square end and said circular end, said bottom portion including a bottom cover of approximately the same size and configuration as said top cover with two parallel side edges and one square end and one circular end, said bottom portion further including a bottom wall means extending an approximately equal distance from said side edges and said square end and said circular end;

a hub in the form of a cylinder rigidly mounted within said housing between said top cover and said bottom cover and in position to be within the inner convolution of an endless coil of tape, said hub being formed from a top section and a bottom section, said top section being integrally formed with said top cover and including a hollow top cylinder extending from said top cover with a hollow top frustrum of a cone extending from said hollow top cylinder said bottom section including a hollow bottom frustrum of a cone extending from said bottom cover with a hollow bottom cylinder extending from said hollow bottom frustrum of a cone, said hollow bottom cylinder having an outside diameter substantially equal to the inside diameter of said top hollow frustrum of a cone and of said top hollow cylinder and being inserted therein for its entire length so that said top hollow frustrum of a cone and said second hollow frustrum of a cone are in contact at their smallest diameter thereby forming a V-groove in said hub adjacent said bottom cover; and guide means rigidly mounted within said bottom portion of said housing across which said tape is pulled from the inner covolution in sliding relationship with said hub and returned to said outer convolution, said guide means including a plurality of individual guide members located adjacent and across said square end of said bottom cover, said top wall means and bottom wall means along said square end having openings therein.

References Cited by the Examiner

UNITED STATES PATENTS

| | | | |
|---|---|---|---|
| 2,327,108 | 8/1943 | Heyer | 242—55.19 |
| 2,921,787 | 1/1960 | Cousino | 242—55.19 |

FRANK J. COHEN, *Primary Examiner.*

LEONARD D. CHRISTIAN, *Examiner.*